DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 8, 1973

910 O.G. 408

T910,008

ALUMINA FILTRATION

Bruce E. Leach and William C. Ziegenhain, Ponco City, Okla., assignors to Continental Oil Company, Ponca City, Okla.

Filed Mar. 29, 1972, Ser. No. 240,317

Int. Cl. B01d *37/02*

U.S. Cl. 210—54

No Drawing. 8 Pages Specification

An improvement in the filtration of aqueous alumina slurries is achieved by the addition of a compound selected from the group consisting of modified polyacrylamides and hydrolyzed copolymers of ethylene and maleic anhydride. Desirable results have been achieved wherein up to about 0.10 weight percent of the hydrolyzed copolymers of ethylene and maleic anhydride was added and wherein up to about 0.25 weight percent modified polyacrylamide was added. Lesser concentrations result in less improvement in filtration while higher concentrations tend to thicken the slurry and make filtration and other process operations difficult. The alumina slurry to be filtered may vary widely from trace amounts of alumina to semi-solid slurries, and any suitable filtration method known to the art may be employed.